(12) United States Patent
Regupathy et al.

(10) Patent No.: US 12,235,780 B2
(45) Date of Patent: Feb. 25, 2025

(54) DYNAMIC USB-C MODE SELECTION OSPM POLICY METHOD AND APPARATUS

(71) Applicant: Intel Corporation, Santa Clara, CA (US)

(72) Inventors: Rajaram Regupathy, Bangalore (IN); Abdul Ismail, Beaverton, OR (US); Saranya Gopal, Bangalore (IN); Peter Ewert, Hillsboro, OR (US); Purushotam Kumar, Bangalore (IN); Vns Murthy Sristi, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 902 days.

(21) Appl. No.: 17/128,075

(22) Filed: Dec. 19, 2020

(65) Prior Publication Data

US 2022/0197842 A1    Jun. 23, 2022

(51) Int. Cl.
   *G06F 13/38* (2006.01)
   *G06F 13/40* (2006.01)
   *G06F 13/42* (2006.01)

(52) U.S. Cl.
   CPC ........ *G06F 13/382* (2013.01); *G06F 13/4072* (2013.01); *G06F 13/4282* (2013.01); *G06F 2213/0038* (2013.01); *G06F 2213/0042* (2013.01); *G06F 2213/3812* (2013.01)

(58) Field of Classification Search
   CPC .................................................. G06F 16/1824
   See application file for complete search history.

(56) References Cited

U.S. PATENT DOCUMENTS

| 6,898,654 B1 * | 5/2005 | Senior ............... G06F 13/387 |
| | | 710/305 |
| 2017/0317739 A1 * | 11/2017 | Emmanuel .......... H04W 72/541 |
| 2018/0356873 A1 * | 12/2018 | Regupathy ............ G06F 1/3253 |

* cited by examiner

*Primary Examiner* — Henry Tsai
*Assistant Examiner* — Juanito C Borromeo
(74) *Attorney, Agent, or Firm* — Schwabe, Williamson & Wyatt, P.C.

(57) ABSTRACT

A scheme to enhance USB-C port policy by dynamically entering optimal USB-C alternate mode with an informed feedback mechanism to OSPM which influences the USB-C port DPM. In some embodiments, when a USB4 device is connected to a port, the scheme parses the alternate modes and power characteristics from the class descriptor information of the enumerated device. In some embodiments, the parsed information is provided as a feedback to the OSPM that instructs the USB-C/PD DPM to enter or switch mode that shall meet the policy criteria of the OS configuration in a dynamic command control from the OS. In some embodiments, the USB-C DPM dynamically chooses to enter an optimal mode based on the power and thermal conditions information available in the embedded controller and indicate the OS about the changes. As such, the OS is aware of the USB operation mode.

13 Claims, 9 Drawing Sheets

| Offset | Field | Size | Value | Description |
|---|---|---|---|---|
| 0 | bLength | 1 | Number | Size of this Descriptor in bytes. |
| 1 | bDescriptorType | 1 | Constant | Descriptor type: DEVICE CAPABILITY Type. |
| 2 | bDevCapabilityType | 1 | Number | BILLBOARD CAPABILITY |
| 3 | iAddtionalInfoURL | 1 | Index | Index of string descriptor providing a URL where the user can go to get more detailed information about the product and the various Alternate Modes it supports. |
| 4 | bNumberOfAlternateModes | 1 | Number | Number of Alternate modes supported. The maximum value that this field can be set to is MAX_NUM_ALT_MODE. |
| 5 | bPreferredAlternateMode | 1 | Number | Index of the preferred Alternate Mode. System software may use this information to provide the user with a better user experience. |
| 1 | bDescriptorType | 1 | Constant | DEVICE Descriptor Type. |
| 6 | VCONN Power | 2 | Bitmap | <table><tr><th>Bit</th><th>Descriptor</th></tr><tr><td>2..0</td><td>Vconn power needed by the adapter for full functionality 001=1W 001b=1.5W 010b=2W 011b=3W 100b=4W 101b=5W 110b=6W 111b=reserved</td></tr><tr><td>14..3</td><td>Reserved for future use, shall be set to zero</td></tr><tr><td>15</td><td>The adapter does not require any Vconn power. The valve in Bits 2..0 are ignored when this bit is set</td></tr></table> |

FIG. 3B

| Offset | Field | Size | Value | Description |
|---|---|---|---|---|
| 8 | bmConfigured | 32 | Bitmap | Each bit pair in this field indicates the state of the Alternate Modes identified by the combination of wSVID[i] and bAlternateMode[i]. A Device Container may support a maximum of MAX_NUM_ALT_MODE Alternate Modes. System software will determine what to display, if anything, based on the value of the bits in this field.<br><br>{| Value | Descriptor |<br>\| 00b \| Unspecified error \|<br>\| 01b \| Alternate Mode configuration not attempted or exited \|<br>\| 10b \| Alternate Mode configuration attempted by unsuccessful and not entered \|<br>\| 11b \| Alternate Mode configuration successful \|}<br><br>This bitmap corresponds to the Alternate Mode as follows:<br>Bit 0: First Alternate Mode defined (at Offset 44)<br><br>Bit 2: Second Alternate Mode defined (at Offset 48)<br>...<br>Bit (n-1) * 2: Nth Alternate Mode defined |

FIG. 3B
(CONT.)

| Offset | Field | Size | Value | Description |
|---|---|---|---|---|
| 40 | bcdVersion | 2 | BCD | Billboard Capability version number in Binary-Coded Decimal (e.g., 1.10 is 0x0110H). This field identifies the release of the Billboard Specification with which the Billboard descriptors are compliant.<br><br>All Device Containers compliant to this version of the specification shall set the value to 0x0121H.<br>   A value of 0x0000H indicates that the device was built to the first version of this specification.<br>   A value of 0x0120H in this field is reserved. |
| 42 | bAdditionalFailureInfo | 1 | Bitmap | Device release number in binary-coded decimal<br><br>{| Bit | Description |<br>\| 0 \| If this filed is set to one then the Device Container failed due to lack of power. \|<br>\| 1 \| If this field is set to one then the Device Container failed due to no USB-PD communication. This field is only valid if bmConfigured field for the preferred Alternate mode is not set to 11b \|} |

FIG. 3B
(CONT.)

| Offset | Field | Size | Value | Description |
|---|---|---|---|---|
| 43 | bReserved | 1 | Zero | Reserved for future use, shall be set to zero |
| 44 | wSVID[0] | 2 | Number | Standard or Vendor ID. This shall match one of the SVIDs returned in response to a USB PD Discover SVIDs command. |
| 46 | bAlternateMode[0] | 1 | Number | Index of the Alternate Mode within the SVID as returned in response to a Discover Modes command. Example: 0 – first Mode entry, 1 – second mode entry |
| 47 | iAlternateModeString[0] | 1 | Index | Index of string descriptor describing protocol. It is optional to support this string. |
| ... | | | | |
| 44+ (n * 4) | wSVID[n] | 2 | Number | Standard or Vendor ID. This shall match one of the SVIDs returned in response to a USB PD Discover SVIDs command. If there is more than one Alternate Mode in the same SVID, the wSVID[n] should be repeated for each Alternate Mode. |
| 46+ (n * 4) | bAlternateMode[n] | 1 | Number | Index of the Alternate Mode within the SVID as returned in response to a Discover Modes command |
| 47+ (n * 4) | iAlternateModeString[n] | 1 | Index | Index of string descriptor describing protocol. It is optional to support this string. |

DYNAMIC USB-C MODE SELECTION OSPM POLICY METHOD AND APPARATUS

BACKGROUND

Universal Serial Bus (USB) has evolved over more than a decade as a ubiquitous interface for peripherals to connect peripherals to the compute system. The evolution of USB bus speed in these years starts from 1.5 Mbps in USB 1.1 specification to the 10 Gbps in the USB 3.1 specification. With the introduction of USB Type-C(USB-C) port and USB Power Delivery specifications the USB-C port has extended the USB port functionality to power and display. The USB-C port has enabled expansion of bandwidth of USB to 20 Gbps with the introduction of USB 3.2 specification which uses additional signal lines made available by the USB-C ports. USB Class specifications which defines the functionalities above this USB bus also evolved take to advantage of this USB bandwidth increase to provide better user experience and leverage the capability of the USB bus. With technology evolution USB4 further defines a connection-oriented, tunneling architecture to combine multiple protocols e.g., (USB, peripheral component interconnect express (PCIe), display port (DP), host-to-host, etc.) onto a single physical interface so that the total speed and performance of the USB4 fabric can be dynamically shared not just between USB devices, but also PCIe or DP end-points. The total bandwidth is now expanded to 40 Gbps (Gen 3×2) over a Type-C connector. USB4 can optionally also support Thunderbolt interface and enable daisy-chaining of devices. With such high-speed and high bandwidth, USB devices consume more power than before. In battery operating systems, managing such high-power consumption by USB devices is a challenge.

Currently, USB-C ports are managed by USB power delivery (PD) outside of a processor (e.g., system-on-chip (SoC)) and operating system (OS) control, which results in inefficient battery life and system performance.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

FIG. 3B depicts Table 1 describing Billboard Capability Descriptors listing alternate modes that the Device Container supports and an optional string for each Alternate Mode supported.

DETAILED DESCRIPTION

Figure 1:
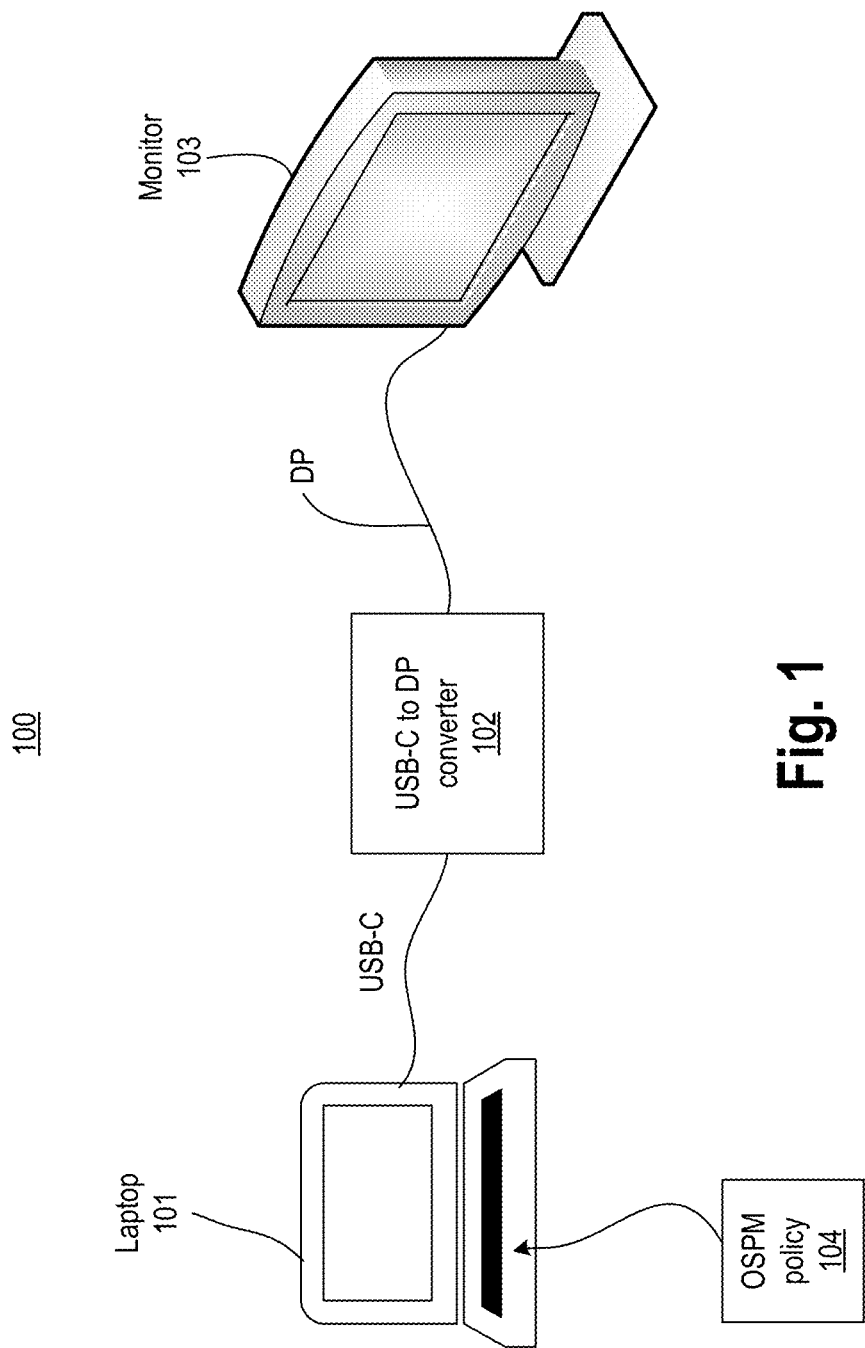
FIG. 1 illustrates a laptop connected to a 4K DP monitor via USB3 adapter, in accordance with some embodiments.

With technology evolution, USB4 further defines a connection-oriented, tunneling architecture to combine multiple protocols (e.g., USB, PCIe, DP, host-to-host) onto a single physical interface so that the total speed and performance of the USB4 fabric can be dynamically shared not just between USB devices, but also PCIe or DP end-points. The total bandwidth with USB4 is expanded to 40 Gbps (Gen 3×2) over a Type-C connector. USB4 can optionally also support Thunderbolt (TBT) interface and enable daisy-chaining of devices.

USB-C Alternate (Alt) mode is an operation or a functional extension defined by a vendor or a standards organization that is associated with aa SVID (Standard ID or Vendor ID) assigned by the USB Implementers Forum (USB-IF). VESA DisplayPort Alt mode on USB Type-C standard specification, version 2.0 released Apr. 29 2020, specifies the use of Display Port (DP) as an alternate mode for the USB-C connector. As per the VESA DisplayPort Alt mode on USB Type-C standard specification, the DP alternate mode can operate in either "DP 4 lane" configuration where all 4 high speed lanes are used for carrying DP data or in "DP 2 lane+USB 3.1" configuration where 2 high speed lanes are used for carrying data and the remaining two lanes for carrying USB 3.1 data.

Similarly, the USB4 Standard defines two mode of operations for a USB4 device that is connected over to a USB4 host that as below. These modes are full functionality mode and basic functionality mode. Higher level of operation or performance is made available when a higher level of power is supplied. For example, 15 Watt (W) for full functionality versus 7.5 W for basic functionality. In this case, the device exposes a Billboard class that indicates functionality limited by the available power.

USB-IF introduced USB Billboard device class specification and USB-C power delivery (PD) specification. USB Billboard Device Class definition describes methods to communicate the alternate modes supported by a device container to a host system. It is useful when the device container supports more than one alternate mode and different configurations. This also helps the host to identify and report if any unsupported device is connected when entry into alternate mode fails.

As per USB-C PD specification, a host shall discover identity mode supported by the device through Standard VDO, and the Device Policy Manager (DPM) decides which mode to enter. Here, VDO refers to Vendor Defined Object. Data Object used to send vendor specific information as part of a Vendor_Defined Message PD (power delivery) Data Message defined for vendor and/or standards usage. These are further partitioned into Structured VDM Messages, where Commands are defined in this specification, and Unstructured VDM Messages which are entirely Vendor Defined. See, for example, USB PD Specification, Version 3.0, Revision 2.0 Aug. 28, 2019. In existing platforms, USB-C/PD DPM (Device Policy Manager) lacks knowledge of operating system (OS) activity that can influence mode selection policy as the DPM typically lies in firmware modules in an embedded controller (EC) or a USB PD controller. In some cases, a user may direct the OS for battery saving (e.g., by selecting "Battery Saver" option on Windows OS) to conserve battery in different operating conditions during video playback with lower resolution indicating the need of longer battery life against performance. However, currently the OS is unaware of the modes of operation of USB4 device(s). As such, the OS may not provide the expected user experience of battery power conservation if it is unaware of the modes of operation of a USB4 device(s) connected to the user's computer system. Existing USB-C/PD system mode selection policy decision is static due to isolated and disconnected policy from the rest of the system that triggers reduced battery life and system performance. As such, existing systems lead to bad user experience with reference to power management.

Some embodiments provide a scheme to enhance USB-C port policy by dynamically entering an optimal USB-C alternate mode with an informed feedback mechanism to OS Power Policy Manager (OSPM) which influences the USB-C port DPM. In some embodiments, when a USB4 device is connected to a port, the scheme parses the alternate modes and power characteristics from the class descriptor information of the enumerated device. In some embodiments, the parsed information is provided as a feedback to the OSPM that instructs the USB-C/PD DPM to enter or switch mode that shall meet the policy criteria of the OS configuration in a dynamic command control from the OS. In some embodiments, the USB-C DPM dynamically chooses to enter an optimal mode based on the power and thermal conditions information available in the embedded controller and indicate to the OS about the changes. As such, the OS is aware of the USB operation mode.

There are many technical effects of various embodiments. For example, the scheme of dynamic selection of operating USB-C mode for optimal performance enables power savings during battery mode (e.g., savings of about 30 minutes). The scheme allows improved system performance (e.g., by about 9%) during higher work load. Other technical effects will be evident from the various figures and embodiments.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

FIG. 1 illustrates system 100 showing a laptop connected to a 4K DP monitor via a USB3 adapter, in accordance with some embodiments. System 100 includes laptop 101, USB-C to DP converter 102, monitor 103, and OSPM 104 (part of an OS). Consider the following scenario in the absence of OSPM 104 having influence over DPM of converter 102. In this scenario system 100 is in battery mode with an external 4K monitor connected via connecter 102 (e.g., USB4 to DP converter). One end of converter 102 (or adapter 102) connects to laptop 101 as a USB4 device with laptop taking away system resource for USB4 operations whereas the other end of converter 102 is legacy DisplayPort (DP) operation with no other functionality for lane or bandwidth sharing. For USB4 operations, in full functionality mode, a 15 W of power is allocated by DPM.

In this case, laptop 101 operating on battery power, will be in USB4 mode even though the connected device is a USB4 converter with dedicated legacy operation where same performance with lower power consumption can be achieved with DP alternate mode. This lack of knowledge by a typical OSPM leads to an inefficient mode selection and usage of system resource leading to bad user experience of faster battery depletion.

In some embodiments, a scheme is provided wherein OSPM 104 executing on laptop 101 parses the USB Billboard device class definition for alternate modes and power characterization. USB Billboard Device Class definition describes the methods used to communicate the Alternate Modes supported by a Device Container to a host system. This includes string descriptors that can be used to provide support details in a human-readable format. USB 2.0 Billboard Device Class is defined to communicate the details of supported Alternate Modes to the computer host OS. The Billboard Device Class provides user readable strings with product description and user support information. Billboard messages can be used to identify incompatible connections made by users. In some examples, Billboard messages are not required to negotiate Alternate Modes and merely appear when negotiation fails between the host (source) and device (sink).

In various embodiments, OSPM 104 applies the parsed class descriptor information associated with converter 102 to determine what the DPM associated with a port of laptop 101 connected converter 102 should operate at. For example, OSPM 104 instructs the USB-C PD DPM to enter or switch operating mode that shall meet the policy criteria of the OSPM (in this case low power because laptop 101 is in battery mode) in a dynamic command control from OSPM 104. In some embodiments, DPM of USB-C PD accesses power and thermal conditions of laptop 101 from any suitable source (e.g., Embedded Controller, power control unit (p-unit)) and provides that information to OSPM 104 so OSPM 104 can deliver the power management expected by the user of laptop 101.

In some embodiments, the Embedded Controller (EC) receives this information from the SoC or it measures using an analog-to-digital converter (ADC) built in the platform temperature or power consumption. Thermal condition of the platform influences the system power levels and thereby system performance. This information received by the EC is used to indicate the DPM to take a decision to change the mode of operation. For example, the information is used to indicate the DPM to select DP alternate mode to reduce power on the USB4 connected device.

Figure 2:
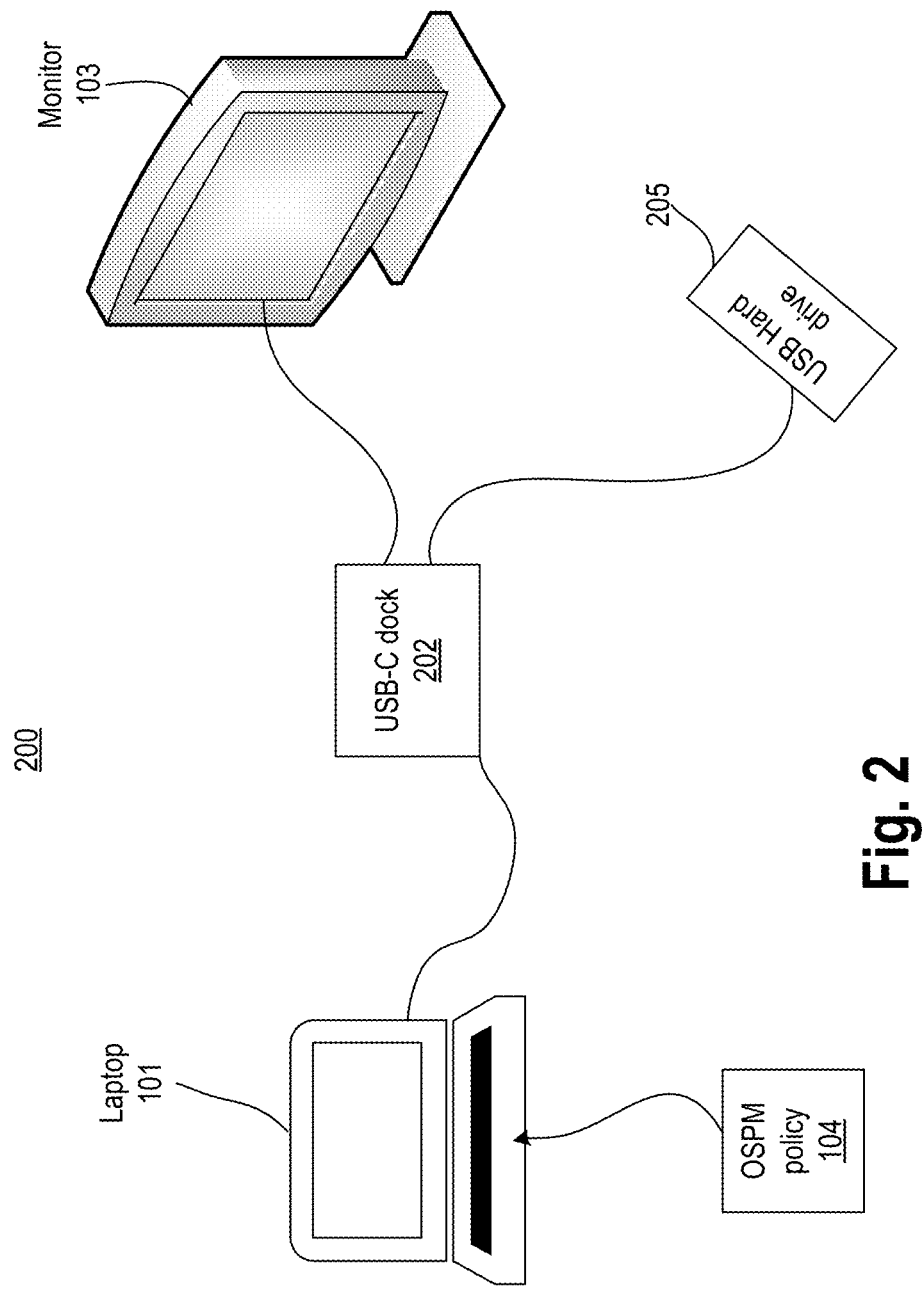
FIG. 2 illustrates a hard drive and display connected to a USB4 dock, in accordance with some embodiments.

FIG. 2 illustrates system 200 having a hard drive (e.g., hard disk drive (HDD)) and display connected to a USB4 dock, in accordance with some embodiments. Compared to system 100, here laptop 101 is connected to USB-C dock 202 which provides DP connection to monitor 103 and USB3.x connection to USB hard driver 205. In this example, the user is editing a movie using a USB3.X hard drive on USB4 dock 202 with DisplayPort as extended display. In the absence of OSPM 104 managing DPM of USB4 port of laptop 101, for every USB4 device connected, power of system-on-chip of laptop 101 regresses (e.g., by ~1.1 W) thereby reducing the system performance.

In the absence of OSPM 104 influencing or directing DPM firmware in laptop 101, USB-C ports are managed in two different configurations by USB PD Controller system.

In both scenarios, the policy decisions are managed by firmware running in an Embedded Controller outside the SoC and OSPM. leading to disconnect in an informed policy decision between the OSPM and the DPM firmware in the selection of USB-C mode of operation. This leads to power inefficiency both in battery life and system performance resulting in bad user experience. In some embodiments, a scheme is provided wherein OSPM 104 executing on laptop 101 parses the USB Billboard device class definition for alternate modes and power characterization. OSPM 104 applies the parsed class descriptor information associated with dock 102 to determine what the DPM associated with the USB port of laptop 101 connected to dock 102 should operate at. As such, the scheme of various embodiments utilizes the information on supported configurations of a USB-C device provided by the Billboard class to enter the alternate mode with optimal configuration for load-balancing and ideal power and performance.

Figure 3A:
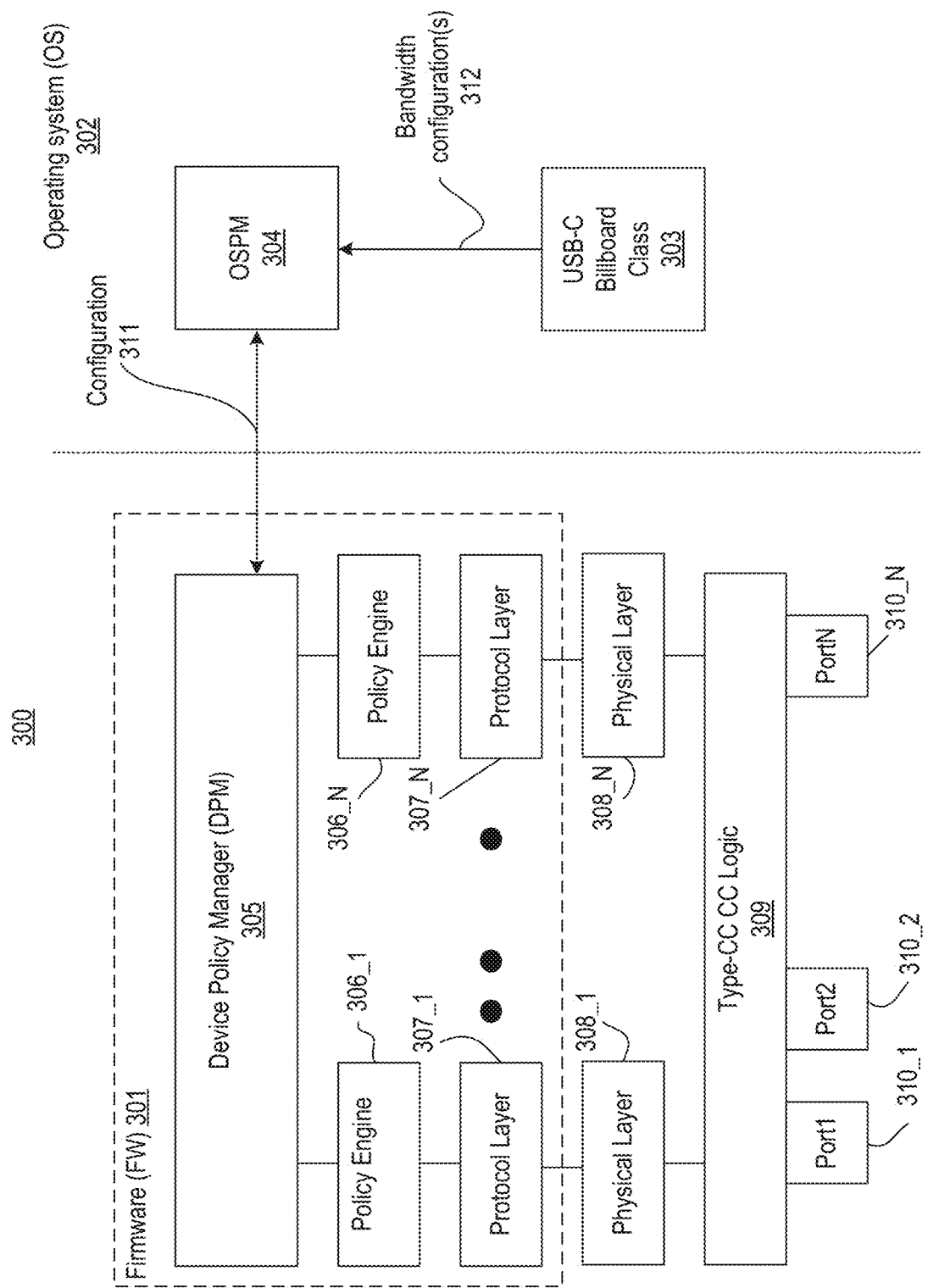
FIG. 3A illustrates an operating system (OS) aware USB-C system having a device policy manager (DPM) influenced by the OS to improve power consumption, in accordance with some embodiments

FIG. 3 illustrates an operating system (OS) aware USB-C system 300 having a device policy manager (DPM) influenced by the OS to improve power consumption, in accordance with some embodiments. System 300 comprises a computing system which includes USB firmware (FW) 301, operating system 302, OSPM 304, and USB-C billboard class 303. In various embodiments, FW 301 includes a plurality of policy engines 306_1 through 306_N, where 'N' is the number of USB ports. FW 301 further comprises protocol layers 307_1 through 307_N. Protocol layers 307_1 through 307_N are coupled to USB-C CC logic 309, which is coupled to USB-C ports (e.g., receptacles) 310_1 through 310_N.

Physical Layer 308 is responsible for sending and receiving Messages across the USB Type-C CC wire between a Port Pair. Policy Engine 306 interprets the Device Policy Manager's input to implement the policy for a given Port and directs Protocol Layer 307 to send appropriate Messages. The entity that forms the Messages is used to communicate information between Port Partners. CC Logic 309 comprises a wire used by the BMC PHY Layer Signaling Scheme BMC: Modification of Manchester coding where each zero has one transition and one has two transitions.

In some embodiments, when a USB-C device supporting multiple configuration and alternate modes is attached to one of the ports 310_1 through 310_N of a computing system, OSPM 304 of OS 302 parses information from Billboard device class 303 exposed by the device. This information includes alternate modes and configurations supported by the USB-C device. Billboard device class 303 ensures that device containers that support alternate modes that are connected to a host that doesn't support one or more of the Alternate Modes has an easy route by which the host can report the same to the user without any silent failures. The Billboard Class 303 has Descriptors that are used to advertise the Alternate Modes a Device Container supports through a BOS descriptor capability. Table 1 describes Billboard Capability Descriptor of the USB-C Billboard Class 303 which are accessible by OSPM 304. The descriptor lists the Alternate Modes the Device Container supports and optional string for each Alternate Mode supported. This descriptor is returned as part of the Device Container's BOS Descriptor set.

In some embodiments, the information of Billboard Class 303 (e.g., Table 1) is provided to the OS power/performance policy manager 304. For example, bandwidth configuration 312 is provided to OSPM 304 so it can determine what power to set for the connected port. Based on the power policy criteria, OS power/performance policy manager 304 selects the optimal configuration 311 for the USB-C device firmware 301. For example, in a USB-C device that supports both type-C DP alternate mode and Thunderbolt mode, the OS power policy manager 304 could select type-C DP alternate mode during Power Save mode and full bandwidth Thunderbolt configuration on Performance mode. Thus, OS power policy manager 304 instructs the USB-C DPM 305 which enables entry into alternate mode with optimal configuration of the USB-C based on OS power policy criteria.

Figure 4:
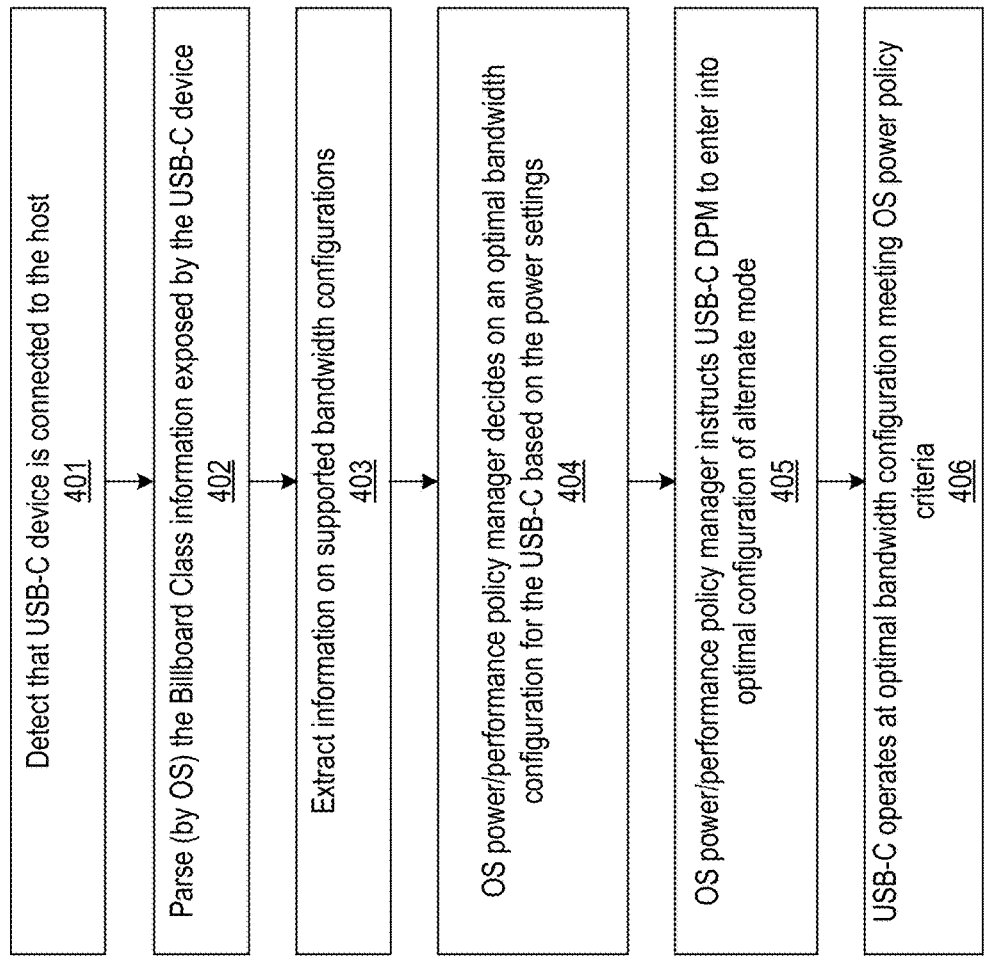
FIG. 4 illustrates a flowchart of a method for selecting optimal configuration for USB-C device operation to improve power consumption, in accordance with some embodiments.

In Table 1, fields that provide details like power and modes are supported by the connected device, namely bNumberOfAlternateModesm bVConnPower etc. Additional information can be retrieved through such descriptors. These descriptors are parsed and parsed information is used to understand what different modes the connected device supports. Based on that information, OSPM 304 decides the optimal mode for the current condition FIG. 4 illustrates flowchart 400 of a method for selecting optimal configuration for USB-C device operation to improve power consumption, in accordance with some embodiments. While various blocks are illustrated in a particular order, the order can be modified. For example, some blocks may be performed before others while some blocks may be performed in parallel. In some embodiments, flowchart 400 is performed by hardware, software, or a combination of them. In some embodiments, various blocks of flowchart are performed by OS 102. In some embodiments, some blocks of flowchart are performed by DPM 305.

At block 401, OS 102 detects that a USB-C device is connected to one of the ports 310_1 through 310_N. In one example, OS 102 gets information about the USB-C device connection via a USB controller and/or an embedded controller. When USB-C device is connected, USB Billboard Class 303 is populated. At block 402, OSPM 104 (part of OS 102) reads information of USB Billboard Class 303 as it relates to USB-C device connected to one of the ports. In some embodiments, each USB-C port has an associated USB Billboard Class 303. As such, OSPM 104 reads USB Billboard Class 303 for each connected USB-C device. At block 403, OSPM 104 extracts supported bandwidth configurations of the USB-C connected device(s) from the parsed information. The bandwidth configurations provide information of the Alternate modes (e.g., full functionality mode or basic functionality mode). In some embodiments, a core bus driver is used to interface between OSPM 104 and Billboard Class 303.

With technology evolution, USB4 further defines a connection-oriented, tunneling architecture to combine multiple protocols (USB, PCIe, DP, host-to-host) onto a single physical interface so that the total speed and performance of the USB4 fabric can be dynamically shared not just between USB devices, but also PCIe or DP end-points. The total bandwidth is expanded to 40 Gbps (Gen 3×2) over a Type-C connector. USB4 can optionally also support Thunderbolt interface and enable daisy-chaining of devices. USB-C Alternate mode is an operation or a functional extension defined by a vendor or a standards organization that is associated with a SVID (Standard ID or Vendor ID) assigned by the USB-IF. 'VESA DisplayPort Alt mode on USB Type-C standard' specification specifies the use of Display Port (DP) as an alternate mode for the USB-C connector. As per the 'VESA DisplayPort Alt mode on USB Type-C standard' specification, the DP alternate mode can operate in either 'DP 4 lane configuration' where all 4 high speed lanes are used for carrying DP data or in 'DP 2 lane+USB 3.1' configuration where 2 high speed lanes are used for carrying data and the remaining two lanes for carrying USB 3.1 data. In USB4, the protocols share bandwidth and in USB-C Alternate Mode, the protocol shares physical lines.

At block 404, OSPM 104 processes the extracted supported bandwidth configurations and decides on an optimal bandwidth configuration 311 for the USB-C based on the power profile (e.g., available power to connect the device). The optimal bandwidth configuration 311 is provided over an Application Programming Interface (API) to DPM 305 as indicated by block 405. An API is a set of programming code that enables data transmission between one software product and another. For example, at block 405, OCPM 104 instructs USB-C DPM 105 to enter into optimal configuration of alternate mode. DPM 105 then instructs the policy engine (e.g., one of engines 306_1 through 306_N) of the USB connected device on one of Ports 310_1 through 310_N about the optimal configuration of alternate mode. The policy engine then sends instructions to the protocol layer (e.g., one of engines 307_1 through 307_N) of the USB connected device. The protocol layer in turn sends instructions to physical layer (e.g., one of 308_1 through 308_N) of the USB connected device. The physical layer then sends voltage and/or current settings to the port of the connected USB port via CC logic 309. As such, at block 406, the connected USB-C device operates at optimal bandwidth configuration meeting OS power policy criteria (e.g., save batter power).

While the various embodiments of flowchart 400 are implemented by OS 102, some or all blocks of flowchart 400 may be implemented in an embedded controller which is aware of system state thermal and power limits. In some embodiments, the EC monitors thermal conditions and platform device connections on ports 310_1 through 310_N and dynamically changes the USB-C port mode by instructing DPM 405. In some embodiments, various embodiments of flowchart 400 are implemented by a power control unit (p-unit) of a system-on-chip or processor. For example, pCode (firmware) of the p-unit may access Billboard Class via OS 102 and then instruct the USB controller (not shown) that executes DMP 105 to change the USB-C port mode.

Figure 5:
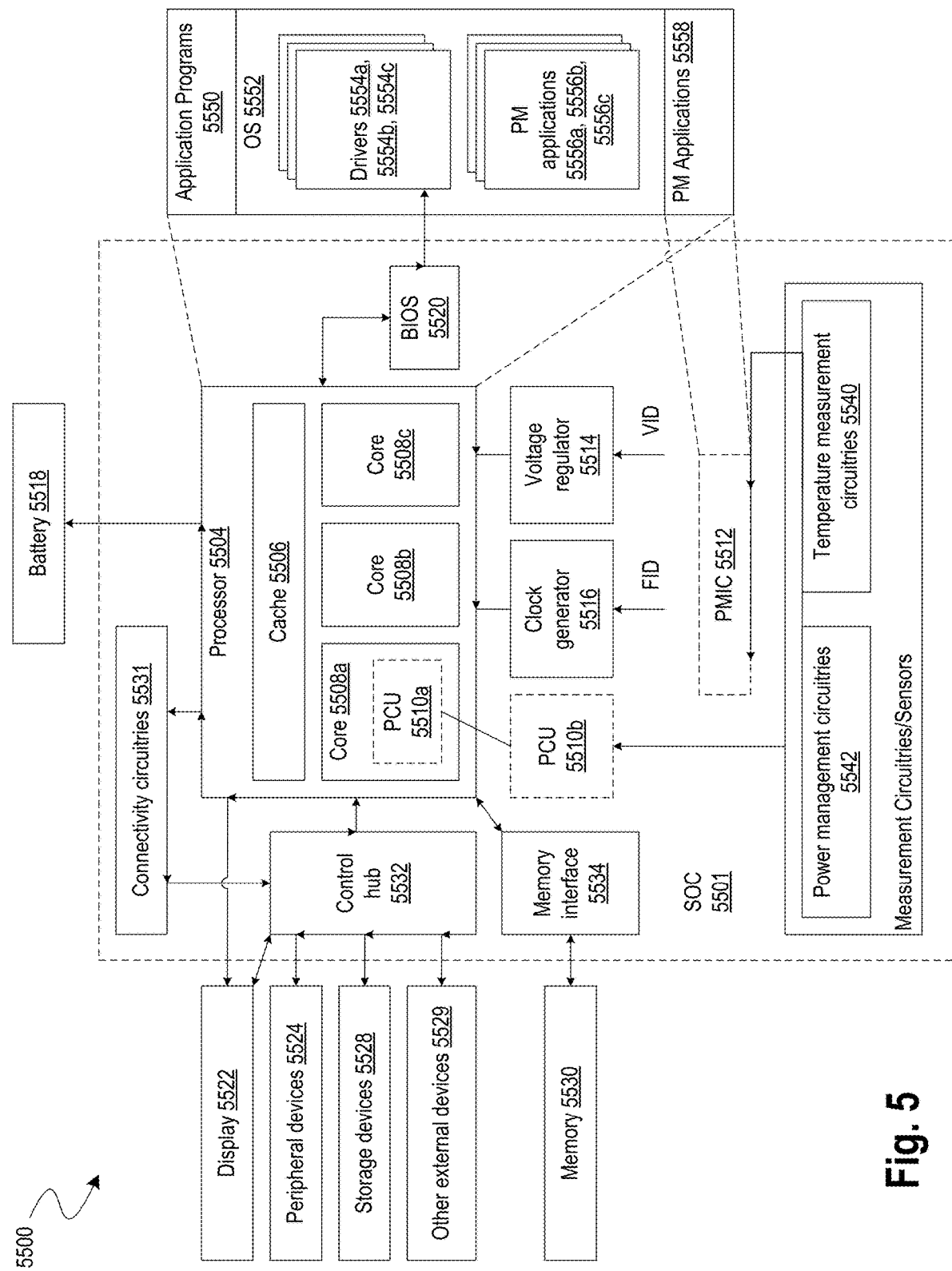
FIG. 5 illustrates a smart device or a computer system or an SoC (System-on-Chip) with apparatus for selecting optimal configuration for USB-C device operation to improve power consumption, in accordance with some embodiments.

FIG. 5 illustrates a smart device or a computer system or an SoC (System-on-Chip) with apparatus for selecting optimal configuration for USB-C device operation to improve power consumption, in accordance with some embodiments. It is pointed out that those elements of FIG. 5 having the same reference numbers (or names) as the elements of any other figure may operate or function in any manner similar to that described, but are not limited to such. In some embodiments, the scheme is implemented by OS 5552, PCU 5510, and/or control hub 5532.

In some embodiments, device 5500 represents an appropriate computing device, such as a computing tablet, a mobile phone or smart-phone, a laptop, a desktop, an Internet-of-Things (IOT) device, a server, a wearable device, a set-top box, a wireless-enabled e-reader, or the like. It will be understood that certain components are shown generally, and not all components of such a device are shown in device 5500.

In an example, the device 5500 comprises an SoC (System-on-Chip) 5501. An example boundary of the SoC 5501 is illustrated using dotted lines in FIG. 5, with some example components being illustrated to be included within SoC 5501—however, SoC 5501 may include any appropriate components of device 5500. While the embodiment here does a multicore processor in a single semiconductor die, other implementations can be realized by a multi-chip package in which different domains and/or cores can be present on different semiconductor die of a single package or multiple packages.

In some embodiments, device 5500 includes processor 5504. Processor 5504 can include one or more physical devices, such as microprocessors, application processors, microcontrollers, programmable logic devices, processing cores, or other processing means. The processing operations performed by processor 5504 include the execution of an operating platform or operating system on which applications and/or device functions are executed. The processing operations include operations related to I/O (input/output) with a human user or with other devices, operations related to power management, operations related to connecting computing device 5500 to another device, and/or the like. The processing operations may also include operations related to audio I/O and/or display I/O.

In some embodiments, processor 5504 includes multiple processing cores (also referred to as cores) 5508a, 5508b, 5508c. Although merely three cores 5508a, 5508b, 5508c are illustrated in FIG. 5, processor 5504 may include any other appropriate number of processing cores, e.g., tens, or even hundreds of processing cores. Processor cores 5508a, 5508b, 5508c may be implemented on a single integrated circuit (IC) chip. Moreover, the chip may include one or more shared and/or private caches, buses or interconnections, graphics and/or memory controllers, or other components.

In some embodiments, processor 5504 includes cache 5506. In an example, sections of cache 5506 may be dedicated to individual cores 5508 (e.g., a first section of cache 5506 dedicated to core 5508a, a second section of cache 5506 dedicated to core 5508b, and so on). In an example, one or more sections of cache 5506 may be shared among two or more of cores 5508. Cache 5506 may be split in different levels, e.g., level 1 (L1) cache, level 2 (L2) cache, level 3 (L3) cache, etc.

In some embodiments, processor core 5504 may include a fetch unit to fetch instructions (including instructions with conditional branches) for execution by the core 5504. The instructions may be fetched from any storage devices such as the memory 5530. Processor core 5504 may also include a decode unit to decode the fetched instruction. For example, the decode unit may decode the fetched instruction into a plurality of micro-operations. Processor core 5504 may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, execution unit may execute instructions out-of-order. Hence, processor core 5504 may be an out-of-order processor core in one embodiment. Processor core 5504 may also include a retirement unit. The retirement unit may retire executed instructions after they are committed. In an embodiment, retirement of the executed instructions may result in processor state being committed from the execution of the instructions, physical registers used by the instructions being de-allocated, etc. Processor core 5504 may also include a bus unit to enable communication between components of processor core 5504 and other components via one or more buses. Processor core 5504 may also include one or more registers to store data accessed by various components of the core 5504 (such as values related to assigned app priorities and/or sub-system states (modes) association.

In some embodiments, device 5500 comprises connectivity circuitries 5531. For example, connectivity circuitries 5531 includes hardware devices (e.g., wireless and/or wired connectors and communication hardware) and/or software components (e.g., drivers, protocol stacks), e.g., to enable device 5500 to communicate with external devices. Device 5500 may be separate from the external devices, such as other computing devices, wireless access points or base stations, etc.

In an example, connectivity circuitries 5531 may include multiple different types of connectivity. To generalize, the connectivity circuitries 5531 may include cellular connectivity circuitries, wireless connectivity circuitries, etc. Cellular connectivity circuitries of connectivity circuitries 5531 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 5531 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 5531 may include a network interface, such as a wired or wireless interface, e.g., so that a system embodiment may be incorporated into a wireless device, for example, a cell phone or personal digital assistant.

In some embodiments, device 5500 comprises control hub 5532, which represents hardware devices and/or software components related to interaction with one or more I/O devices. For example, processor 5504 may communicate with one or more of display 5522, one or more peripheral devices 5524, storage devices 5528, one or more other external devices 5529, etc., via control hub 5532. Control hub 5532 may be a chipset, a Platform Control Hub (PCH), and/or the like.

For example, control hub 5532 illustrates one or more connection points for additional devices that connect to device 5500, e.g., through which a user might interact with the system. For example, devices (e.g., devices 5529) that can be attached to device 5500 include microphone devices, speaker or stereo systems, audio devices, video systems or other display devices, keyboard or keypad devices, or other I/O devices for use with specific applications such as card readers or other devices.

As mentioned above, control hub 5532 can interact with audio devices, display 5522, etc. For example, input through a microphone or other audio device can provide input or commands for one or more applications or functions of device 5500. Additionally, audio output can be provided instead of, or in addition to display output. In another example, if display 5522 includes a touch screen, display 5522 also acts as an input device, which can be at least partially managed by control hub 5532. There can also be additional buttons or switches on computing device 5500 to provide I/O functions managed by control hub 5532. In one embodiment, control hub 5532 manages devices such as accelerometers, cameras, light sensors or other environmental sensors, or other hardware that can be included in device 5500. The input can be part of direct user interaction, as well as providing environmental input to the system to influence its operations (such as filtering for noise, adjusting displays for brightness detection, applying a flash for a camera, or other features).

In some embodiments, control hub 5532 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 5522 represents hardware (e.g., display devices) and software (e.g., drivers) components that provide a visual and/or tactile display for a user to interact with device 5500. Display 5522 may include a display interface, a display screen, and/or hardware device used to provide a display to a user. In some embodiments, display 5522 includes a touch screen (or touch pad) device that provides both output and input to a user. In an example, display 5522 may communicate directly with the processor 5504. Display 5522 can be one or more of an internal display device, as in a mobile electronic device or a laptop device or an external display device attached via a display interface (e.g., DisplayPort, etc.). In one embodiment display 5522 can be a head mounted display (HMD) such as a stereoscopic display device for use in virtual reality (VR) applications or augmented reality (AR) applications.

In some embodiments, and although not illustrated in the figure, in addition to (or instead of) processor 5504, device 5500 may include Graphics Processing Unit (GPU) comprising one or more graphics processing cores, which may control one or more aspects of displaying contents on display 5522.

Control hub 5532 (or platform controller hub) may include hardware interfaces and connectors, as well as software components (e.g., drivers, protocol stacks) to make peripheral connections, e.g., to peripheral devices 5524.

It will be understood that device 5500 could both be a peripheral device to other computing devices, as well as have peripheral devices connected to it. Device 5500 may have a "docking" connector to connect to other computing devices for purposes such as managing (e.g., downloading and/or uploading, changing, synchronizing) content on device 5500. Additionally, a docking connector can allow device 5500 to connect to certain peripherals that allow computing device 5500 to control content output, for example, to audiovisual or other systems.

In addition to a proprietary docking connector or other proprietary connection hardware, device 5500 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 5531 may be coupled to control hub 5532, e.g., in addition to, or instead of, being coupled directly to the processor 5504. In some embodiments, display 5522 may be coupled to control hub 5532, e.g., in addition to, or instead of, being coupled directly to processor 5504.

In some embodiments, device 5500 comprises memory 5530 coupled to processor 5504 via memory interface 5534. Memory 5530 includes memory devices for storing information in device 5500.

In some embodiments, memory 5530 includes apparatus to maintain stable clocking as described with reference to various embodiments. Memory can include nonvolatile (state does not change if power to the memory device is interrupted) and/or volatile (state is indeterminate if power to the memory device is interrupted) memory devices. Memory device 5530 can be a dynamic random-access memory (DRAM) device, a static random-access memory (SRAM) device, flash memory device, phase-change memory device, or some other memory device having suitable performance to serve as process memory. In one embodiment, memory 5530 can operate as system memory for device 5500, to store data and instructions for use when the one or more processors 5504 executes an application or process. Memory 5530 can store application data, user data, music, photos, documents, or other data, as well as system data (whether long-term or temporary) related to the execution of the applications and functions of device 5500.

Elements of various embodiments and examples are also provided as a machine-readable medium (e.g., memory 5530) for storing the computer-executable instructions (e.g., instructions to implement any other processes discussed herein). The machine-readable medium (e.g., memory 5530) may include, but is not limited to, flash memory, optical disks, CD-ROMs, DVD ROMs, RAMS, EPROMS, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 5500 comprises temperature measurement circuitries 5540, e.g., for measuring temperature of various components of device 5500. In an example, temperature measurement circuitries 5540 may be embedded, or coupled or attached to various components, whose temperature are to be measured and monitored. For example, temperature measurement circuitries 5540 may measure temperature of (or within) one or more of cores 5508a, 5508b, 5508c, voltage regulator 5514, memory 5530, a mother-board of SoC 5501, and/or any appropriate component of device 5500. In some embodiments, temperature measurement circuitries 5540 include a low power hybrid reverse (LPHR) bandgap reference (BGR) and digital temperature sensor (DTS), which utilizes subthreshold metal oxide semiconductor (MOS) transistor and the PNP parasitic Bi-polar Junction Transistor (BJT) device to form a reverse BGR that serves as the base for configurable BGR or DTS operating modes. The LPHR architecture uses low-cost MOS. transistors and the standard parasitic PNP device. Based on a reverse bandgap voltage, the LPHR can work as a configurable BGR. By comparing the configurable BGR with the scaled base-emitter voltage, the circuit can also perform as a DTS with a linear transfer function with single-temperature trim for high accuracy.

In some embodiments, device 5500 comprises power measurement circuitries 5542, e.g., for measuring power consumed by one or more components of the device 5500. In an example, in addition to, or instead of, measuring power, the power measurement circuitries 5542 may measure voltage and/or current. In an example, the power measurement circuitries 5542 may be embedded, or coupled or attached to various components, whose power, voltage, and/or current consumption are to be measured and monitored. For example, power measurement circuitries 5542 may measure power, current and/or voltage supplied by one or more voltage regulators 5514, power supplied to SoC 5501, power supplied to device 5500, power consumed by processor 5504 (or any other component) of device 5500, etc.

In some embodiments, device 5500 comprises one or more voltage regulator circuitries, generally referred to as voltage regulator (VR) 5514. VR 5514 generates signals at appropriate voltage levels, which may be supplied to operate any appropriate components of the device 5500. Merely as an example, VR 5514 is illustrated to be supplying signals to processor 5504 of device 5500. In some embodiments, VR 5514 receives one or more Voltage Identification (VID) signals, and generates the voltage signal at an appropriate level, based on the VID signals. Various type of VRs may be utilized for the VR 5514. For example, VR 5514 may include a "buck" VR, "boost" VR, a combination of buck and boost VRs, low dropout (LDO) regulators, switching DC-DC regulators, constant-on-time controller-based DC-DC regulator, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR, which is controlled by PCU 5510a/b and/or PMIC 5512. In some embodiments, each core has a network of distributed LDOs to provide efficient control for power management. The LDOs can be digital, analog, or a combination of digital or analog LDOs. In some embodiments, VR 5514 includes current tracking apparatus to measure current through power supply rail(s).

In some embodiments, VR 5514 includes a digital control scheme to manage states of a proportional-integral-derivative (PID) filter (also known as a digital Type-III compensator). The digital control scheme controls the integrator of the PID filter to implement non-linear control of saturating the duty cycle during which the proportional and derivative terms of the PID are set to 0 while the integrator and its internal states (previous values or memory) is set to a duty cycle that is the sum of the current nominal duty cycle plus a deltaD. The deltaD is the maximum duty cycle increment that is used to regulate a voltage regulator from ICCmin to ICCmax and is a configuration register that can be set post silicon. A state machine moves from a non-linear all ON state (which brings the output voltage Vout back to a regulation window) to an open loop duty cycle which maintains the output voltage slightly higher than the required reference voltage Vref. After a certain period in this state of open loop at the commanded duty cycle, the state machine then ramps down the open loop duty cycle value until the output voltage is close to the Vref commanded. As such, output chatter on the output supply from VR 5514 is completely eliminated (or substantially eliminated) and there is merely a single undershoot transition which could lead to a guaranteed Vmin based on a comparator delay and the di/dt of the load with the available output decoupling capacitance.

In some embodiments, VR 5514 includes a separate self-start controller, which is functional without fuse and/or trim information. The self-start controller protects VR 5514 against large inrush currents and voltage overshoots, while being capable of following a variable VID (voltage identification) reference ramp imposed by the system. In some embodiments, the self-start controller uses a relaxation oscillator built into the controller to set the switching frequency of the buck converter. The oscillator can be initialized using either a clock or current reference to be close to a desired operating frequency. The output of VR 5514 is coupled weakly to the oscillator to set the duty cycle for closed loop operation. The controller is naturally biased such that the output voltage is always slightly higher than the set point, eliminating the need for any process, voltage, and/or temperature (PVT) imposed trims.

In some embodiments, VR 5514 includes a one-shot inductor current scheme which comprises a controller to generate a signal to control a high-side switch and a low-side switch such that the high-side switch remains turned on beyond a turn-on time if a voltage level on an output supply rail remains below a reference. The scheme reduces the minimum operating voltage Vmin and/or frequency guardband of SoC 5501.

In some embodiments, device 5500 comprises one or more clock generator circuitries, generally referred to as clock generator 5516. Clock generator 5516 generates clock signals at appropriate frequency levels, which may be supplied to any appropriate components of device 5500. Merely as an example, clock generator 5516 is illustrated to be supplying clock signals to processor 5504 of device 5500. In some embodiments, clock generator 5516 receives one or more Frequency Identification (FID) signals, and generates the clock signals at an appropriate frequency, based on the FID signals.

In some embodiments, device 5500 comprises battery 5518 supplying power to various components of device 5500. Merely as an example, battery 5518 is illustrated to be supplying power to processor 5504. Although not illustrated in the figures, device 5500 may comprise a charging circuitry, e.g., to recharge the battery, based on Alternating Current (AC) power supply received from an AC adapter.

In some embodiments, battery 5518 periodically checks an actual battery capacity or energy with charge to a preset voltage (e.g., 4.1 V). The battery then decides of the battery capacity or energy. If the capacity or energy is insufficient, then an apparatus in or associated with the battery slightly increases charging voltage to a point where the capacity is sufficient (e.g. from 4.1 V to 4.11 V). The process of periodically checking and slightly increase charging voltage is performed until charging voltage reaches specification limit (e.g., 4.2 V). The scheme described herein has benefits such as battery longevity can be extended, risk of insufficient energy reserve can be reduced, burst power can be used as long as possible, and/or even higher burst power can be used.

In some embodiments, the charging circuitry (e.g., 5518) comprises a buck-boost converter. This buck-boost converter comprises DrMOS or DrGaN devices used in place of half-bridges for traditional buck-boost converters. Various embodiments here are described with reference to DrMOS. However, the embodiments are applicable to DrGaN. The DrMOS devices allow for better efficiency in power conversion due to reduced parasitic and optimized MOSFET packaging. Since the dead-time management is internal to the DrMOS, the dead-time management is more accurate than for traditional buck-boost converters leading to higher efficiency in conversion. Higher frequency of operation allows for smaller inductor size, which in turn reduces the z-height of the charger comprising the DrMOS based buck-boost converter. The buck-boost converter of various embodiments comprises dual-folded bootstrap for DrMOS devices. In some embodiments, in addition to the traditional bootstrap capacitors, folded bootstrap capacitors are added that cross-couple inductor nodes to the two sets of DrMOS switches.

In some embodiments, device 5500 comprises Power Control Unit (PCU) 5510 (also referred to as Power Management Unit (PMU), Power Management Controller (PMC), Power Unit (p-unit), etc.). In an example, some sections of PCU 5510 may be implemented by one or more processing cores 5508, and these sections of PCU 5510 are symbolically illustrated using a dotted box and labelled PCU 5510*a*. In an example, some other sections of PCU 5510 may be implemented outside the processing cores 5508, and these sections of PCU 5510 are symbolically illustrated using a dotted box and labelled as PCU 5510*b*. PCU 5510 may implement various power management operations for device 5500. PCU 5510 may include hardware interfaces, hardware circuitries, connectors, registers, etc., as well as software components (e.g., drivers, protocol stacks), to implement various power management operations for device 5500.

In various embodiments, PCU or PMU 5510 is organized in a hierarchical manner forming a hierarchical power management (HPM). HPM of various embodiments builds a capability and infrastructure that allows for package level management for the platform, while still catering to islands of autonomy that might exist across the constituent die in the package. HPM does not assume a pre-determined mapping of physical partitions to domains. An HPM domain can be aligned with a function integrated inside a dielet, to a dielet boundary, to one or more dielets, to a companion die, or even a discrete CXL device. HPM addresses integration of multiple instances of the same die, mixed with proprietary functions or 3rd party functions integrated on the same die or separate die, and even accelerators connected via CXL (e.g., Flexbus) that may be inside the package, or in a discrete form factor.

HPM enables designers to meet the goals of scalability, modularity, and late binding. HPM also allows PMU functions that may already exist on other dice to be leveraged, instead of being disabled in the flat scheme. HPM enables management of any arbitrary collection of functions independent of their level of integration. HPM of various embodiments is scalable, modular, works with symmetric multi-chip processors (MCPs), and works with asymmetric MCPs. For example, HPM does not need a signal PM controller and package infrastructure to grow beyond reasonable scaling limits. HPM enables late addition of a die in a package without the need for change in the base die infrastructure. HPM addresses the need of disaggregated solutions having dies of different process technology nodes coupled in a single package. HPM also addresses the needs of companion die integration solutions—on and off package.

In various embodiments, each die (or dielet) includes a power management unit (PMU) or p-unit. For example, processor dies can have a supervisor p-unit, supervisee p-unit, or a dual role supervisor/supervisee p-unit. In some embodiments, an I/O die has its own dual role p-unit such as supervisor and/or supervisee p-unit. The p-units in each die can be instances of a generic p-unit. In one such example, all p-units have the same capability and circuits, but are configured (dynamically or statically) to take a role of a supervisor, supervisee, and/or both. In some embodiments, the p-units for compute dies are instances of a compute p-unit while p-units for IO dies are instances of an IO p-unit different from the compute p-unit. Depending on the role, p-unit acquires specific responsibilities to manage power of the multichip module and/or computing platform. While various p-units are described for dies in a multichip module or system-on-chip, a p-unit can also be part of an external device such as I/O device.

Here, the various p-units do not have to be the same. The HPM architecture can operate very different types of p-units. One common feature for the p-units is that they are expected to receive HPM messages and are expected to be able to comprehend them. In some embodiments, the p-unit of IO dies may be different than the p-unit of the compute dies. For example, the number of register instances of each class of register in the IO p-unit is different than those in the p-units of the compute dies. An IO die has the capability of being an HPM supervisor for CXL connected devices, but compute die may not need to have that capability. The IO and computes dice also have different firmware flows and possibly different firmware images. These are choices that an implementation can make. An HPM architecture can choose to have one superset firmware image and selectively execute flows that are relevant to the die type the firmware is associated with. Alternatively, there can be a customer firmware for each p-unit type; it can allow for more streamlined sizing of the firmware storage requirements for each p-unit type.

The p-unit in each die can be configured as a supervisor p-unit, supervisee p-unit or with a dual role of supervisor/supervisee 105. As such, p-units can perform roles of supervisor or supervisee for various domains. In various embodiments, each instance of p-unit is capable of autonomously managing local dedicated resources and contains structures to aggregate data and communicate between instances to enable shared resource management by the instance configured as the shared resource supervisor. A message and wire-based infrastructure is provided that can be duplicated and configured to facilitate management and flows between multiple p-units.

In some embodiments, power and thermal thresholds are communicated by a supervisor p-unit to supervisee p-units. For example, a supervisor p-unit learns of the workload (present and future) of each die, power measurements of each die, and other parameters (e.g., platform level power boundaries) and determines new power limits for each die. These power limits are then communicated by supervisor p-units to the supervisee p-units via one or more interconnects and fabrics. In some embodiments, a fabric indicates a group of fabrics and interconnect including a first fabric, a second fabric, and a fast response interconnect. In some embodiments, the first fabric is used for common communication between a supervisor p-unit and a supervisee p-unit. These common communications include change in voltage, frequency, and/or power state of a die which is planned based on a number of factors (e.g., future workload, user behavior, etc.). In some embodiments, the second fabric is used for higher priority communication between supervisor p-unit and supervisee p-unit. Example of higher priority communication include a message to throttle because of a possible thermal runaway condition, reliability issue, etc. In some embodiments, a fast response interconnect is used for communicating fast or hard throttle of all dies. In this case, a supervisor p-unit may send a fast throttle message to all other p-units, for example. In some embodiments, a fast response interconnect is a legacy interconnect whose function can be performed by the second fabric.

The HPM architecture of various embodiments enables scalability, modularity, and late binding of symmetric and/or asymmetric dies. Here, symmetric dies are dies of same size, type, and/or function, while asymmetric dies are dies of different size, type, and/or function. Hierarchical approach also allows PMU functions that may already exist on other dice to be leveraged, instead of being disabled in the traditional flat power management scheme. HPM does not assume a pre-determined mapping of physical partitions to domains. An HPM domain can be aligned with a function integrated inside a dielet, to a dielet boundary, to one or more dielets, to a companion die, or even a discrete CXL device. HPM enables management of any arbitrary collection of functions independent of their level of integration. In some embodiments, a p-unit is declared a supervisor p-unit based on one or more factors. These factors include memory size, physical constraints (e.g., number of pin-outs), and locations of sensors (e.g., temperature, power consumption, etc.) to determine physical limits of the processor.

The HPM architecture of various embodiments, provides a means to scale power management so that a single p-unit instance does not need to be aware of the entire processor. This enables power management at a smaller granularity and improves response times and effectiveness. Hierarchical structure maintains a monolithic view to the user. For example, at an operating system (OS) level, HPM architecture gives the OS a single PMU view even though the PMU is physically distributed in one or more supervisor-supervisee configurations.

In some embodiments, the HPM architecture is centralized where one supervisor controls all supervisees. In some embodiments, the HPM architecture is decentralized, wherein various p-units in various dies control overall power management by peer-to-peer communication. In some embodiments, the HPM architecture is distributed where there are different supervisors for different domains. One example of a distributed architecture is a tree-like architecture.

In some embodiments, device 5500 comprises Power Management Integrated Circuit (PMIC) 5512, e.g., to implement various power management operations for device 5500. In some embodiments, PMIC 5512 is a Reconfigurable Power Management ICs (RPMICs) and/or an IMVP (Intel® Mobile Voltage Positioning). In an example, the PMIC is within an IC die separate from processor 5504. The may implement various power management operations for device 5500. PMIC 5512 may include hardware interfaces, hardware circuitries, connectors, registers, etc., as well as software components (e.g., drivers, protocol stacks), to implement various power management operations for device 5500.

In an example, device 5500 comprises one or both PCU 5510 or PMIC 5512. In an example, any one of PCU 5510 or PMIC 5512 may be absent in device 5500, and hence, these components are illustrated using dotted lines.

Various power management operations of device 5500 may be performed by PCU 5510, by PMIC 5512, or by a combination of PCU 5510 and PMIC 5512. For example, PCU 5510 and/or PMIC 5512 may select a power state (e.g., P-state) for various components of device 5500. For example, PCU 5510 and/or PMIC 5512 may select a power state (e.g., in accordance with the ACPI (Advanced Configuration and Power Interface) specification) for various components of device 5500. Merely as an example, PCU 5510 and/or PMIC 5512 may cause various components of the device 5500 to transition to a sleep state, to an active state, to an appropriate C state (e.g., C0 state, or another appropriate C state, in accordance with the ACPI specification), etc. In an example, PCU 5510 and/or PMIC 5512 may control a voltage output by VR 5514 and/or a frequency of a clock signal output by the clock generator, e.g., by outputting the VID signal and/or the FID signal, respectively. In an example, PCU 5510 and/or PMIC 5512 may control battery power usage, charging of battery 5518, and features related to power saving operation.

The clock generator 5516 can comprise a phase locked loop (PLL), frequency locked loop (FLL), or any suitable clock source. In some embodiments, each core of processor 5504 has its own clock source. As such, each core can operate at a frequency independent of the frequency of operation of the other core. In some embodiments, PCU 5510 and/or PMIC 5512 performs adaptive or dynamic frequency scaling or adjustment. For example, clock frequency of a processor core can be increased if the core is not operating at its maximum power consumption threshold or limit. In some embodiments, PCU 5510 and/or PMIC 5512 determines the operating condition of each core of a processor, and opportunistically adjusts frequency and/or power supply voltage of that core without the core clocking source (e.g., PLL of that core) losing lock when the PCU 5510 and/or PMIC 5512 determines that the core is operating below a target performance level. For example, if a core is drawing current from a power supply rail less than a total current allocated for that core or processor 5504, then PCU 5510 and/or PMIC 5512 can temporality increase the power draw for that core or processor 5504 (e.g., by increasing clock frequency and/or power supply voltage level) so that the core or processor 5504 can perform at higher performance level. As such, voltage and/or frequency can be increased temporality for processor 5504 without violating product reliability.

In an example, PCU 5510 and/or PMIC 5512 may perform power management operations, e.g., based at least in part on receiving measurements from power measurement circuitries 5542, temperature measurement circuitries 5540, charge level of battery 5518, and/or any other appropriate information that may be used for power management. To that end, PMIC 5512 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor(s) may be directly coupled to PCU 5510 and/or PMIC 5512 in at least one embodiment to allow PCU 5510 and/or PMIC 5512 to manage processor core energy at least in part based on value(s) detected by one or more of the sensors.

Also illustrated is an example software stack of device 5500 (although not all elements of the software stack are illustrated). Merely as an example, processors 5504 may execute application programs 5550, Operating System 5552, one or more Power Management (PM) specific application programs (e.g., generically referred to as PM applications 5558), and/or the like. PM applications 5558 may also be executed by the PCU 5510 and/or PMIC 5512. OS 5552 may also include one or more PM applications 5556*a*, 5556*b*, 5556*c*. The OS 5552 may also include various drivers 5554*a*, 5554*b*, 5554*c*, etc., some of which may be specific for power management purposes. In some embodiments, device 5500 may further comprise a Basic Input/output System (BIOS) 5520. BIOS 5520 may communicate with OS 5552 (e.g., via one or more drivers 5554), communicate with processors 5504, etc.

For example, one or more of PM applications 5558, 5556, drivers 5554, BIOS 5520, etc. may be used to implement power management specific tasks, e.g., to control voltage and/or frequency of various components of device 5500, to control wake-up state, sleep state, and/or any other appropriate power state of various components of device 5500, control battery power usage, charging of the battery 5518, features related to power saving operation, etc.

In some embodiments, battery 5518 is a Li-metal battery with a pressure chamber to allow uniform pressure on a battery. The pressure chamber is supported by metal plates (such as pressure equalization plate) used to give uniform pressure to the battery. The pressure chamber may include pressured gas, elastic material, spring plate, etc. The outer skin of the pressure chamber is free to bow, restrained at its edges by (metal) skin, but still exerts a uniform pressure on the plate that is compressing the battery cell. The pressure chamber gives uniform pressure to battery, which is used to enable high-energy density battery with, for example, 20% more battery life.

In some embodiments, pCode executing on PCU 5510*a/b* has a capability to enable extra compute and telemetries resources for the runtime support of the pCode. Here pCode refers to a firmware executed by PCU 5510*a/b* to manage performance of the 5501. For example, pCode may set frequencies and appropriate voltages for the processor. Part of the pCode are accessible via OS 5552. In various embodiments, mechanisms and methods are provided that dynamically change an Energy Performance Preference (EPP) value based on workloads, user behavior, and/or system conditions. There may be a well-defined interface between OS 5552 and the pCode. The interface may allow or facilitate the software configuration of several parameters and/or may provide hints to the pCode. As an example, an EPP parameter may inform a pCode algorithm as to whether performance or battery life is more important.

This support may be done as well by the OS 5552 by including machine-learning support as part of OS 5552 and either tuning the EPP value that the OS hints to the hardware (e.g., various components of SCO 5501) by machine-learning prediction, or by delivering the machine-learning prediction to the pCode in a manner similar to that done by a Dynamic Tuning Technology (DTT) driver. In this model, OS 5552 may have visibility to the same set of telemetries as are available to a DTT. As a result of a DTT machine-learning hint setting, pCode may tune its internal algorithms to achieve optimal power and performance results following the machine-learning prediction of activation type. The pCode as example may increase the responsibility for the processor utilization change to enable fast response for user activity, or may increase the bias for energy saving either by reducing the responsibility for the processor utilization or by saving more power and increasing the performance lost by tuning the energy saving optimization. This approach may facilitate saving more battery life in case the types of activities enabled lose some performance level over what the system can enable. The pCode may include an algorithm for dynamic EPP that may take the two inputs, one from OS 5552 and the other from software such as DTT, and may selectively choose to provide higher performance and/or responsiveness. As part of this method, the pCode may enable in the DTT an option to tune its reaction for the DTT for different types of activity.

In some embodiments, pCode improves the performance of the SoC in battery mode. In some embodiments, pCode allows drastically higher SoC peak power limit levels (and thus higher Turbo performance) in battery mode. In some embodiments, pCode implements power throttling and is part of Intel's Dynamic Tuning Technology (DTT). In various embodiments, the peak power limit is referred to PL4. However, the embodiments are applicable to other peak power limits. In some embodiments, pCode sets the Vth threshold voltage (the voltage level at which the platform will throttle the SoC) in such a way as to prevent the system from unexpected shutdown (or black screening). In some embodiments, pCode calculates the Psoc,pk SoC Peak Power Limit (e.g., PL4), according to the threshold voltage (Vth). These are two dependent parameters, if one is set, the other can be calculated. pCode is used to optimally set one parameter (Vth) based on the system parameters, and the history of the operation. In some embodiments, pCode provides a scheme to dynamically calculate the throttling level (Psoc,th) based on the available battery. power (which changes slowly) and set the SoC throttling peak power (Psoc,th). In some embodiments, pCode decides the frequencies and voltages based on Psoc,th. In this case, throttling events have less negative effect on the SoC performance. Various embodiments provide a scheme which allows maximum performance (Pmax) framework to operate.

In some embodiments, VR 5514 includes a current sensor to sense and/or measure current through a high-side switch of VR 5514. In some embodiments the current sensor uses an amplifier with capacitively coupled inputs in feedback to sense the input offset of the amplifier, which can be compensated for during measurement. In some embodiments, the amplifier with capacitively coupled inputs in feedback is used to operate the amplifier in a region where the input common-mode specifications are relaxed, so that the feedback loop gain and/or bandwidth is higher. In some embodiments, the amplifier with capacitively coupled inputs in feedback is used to operate the sensor from the converter input voltage by employing high-PSRR (power supply rejection ratio) regulators to create a local, clean supply voltage, causing less disruption to the power grid in the switch area. In some embodiments, a variant of the design can be used to sample the difference between the input voltage and the controller supply, and recreate that between the drain voltages of the power and replica switches. This allows the sensor to not be exposed to the power supply voltage. In some embodiments, the amplifier with capacitively coupled inputs in feedback is used to compensate for power delivery network related (PDN-related) changes in the input voltage during current sensing.

Throughout the specification, and in the claims, the term "connected" means a direct connection, such as electrical, mechanical, or magnetic connection between the things that are connected, without any intermediary devices.

The term "coupled" means a direct or indirect connection, such as a direct electrical, mechanical, or magnetic connection between the things that are connected or an indirect connection, through one or more passive or active intermediary devices.

The term "adjacent" here generally refers to a position of a thing being next to (e.g., immediately next to or close to with one or more things between them) or adjoining another thing (e.g., abutting it).

The term "circuit" or "module" may refer to one or more passive and/or active components that are arranged to cooperate with one another to provide a desired function.

The term "signal" may refer to at least one current signal, voltage signal, magnetic signal, or data/clock signal. The meaning of "a," "an," and "the" include plural references. The meaning of "in" includes "in" and "on."

The term "analog signal" is any continuous signal for which the time varying feature (variable) of the signal is a representation of some other time varying quantity, i.e., analogous to another time varying signal.

The term "digital signal" is a physical signal that is a representation of a sequence of discrete values (a quantified discrete-time signal), for example of an arbitrary bit stream, or of a digitized (sampled and analog-to-digital converted) analog signal.

The term "scaling" generally refers to converting a design (schematic and layout) from one process technology to another process technology and may be subsequently being reduced in layout area. In some cases, scaling also refers to upsizing a design from one process technology to another process technology and may be subsequently increasing layout area. The term "scaling" generally also refers to downsizing or upsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions.

It is pointed out that those elements of the figures having the same reference numbers (or names) as the elements of any other figure can operate or function in any manner similar to that described but are not limited to such.

For purposes of the embodiments, the transistors in various circuits and logic blocks described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), Square Wire, or Rectangular Ribbon Transistors, ferroelectric FET (FeFETs), or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors (BJT PNP/NPN), BiCMOS, CMOS, etc., may be used without departing from the scope of the disclosure.

Here the term "supervisor" generally refers to a power controller, or power management, unit (a "p-unit"), which monitors and manages power and performance related parameters for one or more associated power domains, either alone or in cooperation with one or more other p-units. Power/performance related parameters may include but are not limited to domain power, platform power, voltage, voltage domain current, die current, load-line, temperature, utilization, clock frequency, processing efficiency, current/future workload information, and other parameters. It may determine new power or performance parameters (limits, average operational, etc.) for the one or more domains. These parameters may then be communicated to supervisee p-units, or directly to controlled or monitored entities such as VR or clock throttle control registers, via one or more fabrics and/or interconnects. A supervisor learns of the workload (present and future) of one or more dies, power measurements of the one or more dies, and other parameters (e.g., platform level power boundaries) and determines new power limits for the one or more dies. These power limits are then communicated by supervisor p-units to the supervisee p-units via one or more fabrics and/or interconnect. In examples where a die has one p-unit, a supervisor (Svor) p-unit is also referred to as supervisor die.

Here the term "supervisee" generally refers to a power controller, or power management, unit (a "p-unit"), which monitors and manages power and performance related parameters for one or more associated power domains, either alone or in cooperation with one or more other p-units and receives instructions from a supervisor to set power and/or performance parameters (e.g., supply voltage, operating frequency, maximum current, throttling threshold, etc.) for its associated power domain. In examples where a die has one p-unit, a supervisee (Svee) p-unit may also be referred to as a supervisee die. Note that a p-unit may serve either as a Svor, a Svee, or both a Svor/Svee p-unit.

Here, the term "processor core" generally refers to an independent execution unit that can run one program thread at a time in parallel with other cores. A processor core may include a dedicated power controller or power control unit (p-unit) which can be dynamically or statically configured as a supervisor or supervisee. This dedicated p-unit is also referred to as an autonomous p-unit, in some examples. In some examples, all processor cores are of the same size and functionality i.e., symmetric cores. However, processor cores can also be asymmetric. For example, some processor cores have different size and/or function than other processor cores. A processor core can be a virtual processor core or a physical processor core.

Here the term "die" generally refers to a single continuous piece of semiconductor material (e.g. silicon) where transistors or other components making up a processor core may reside. Multi-core processors may have two or more processors on a single die, but alternatively, the two or more processors may be provided on two or more respective dies. Each die has a dedicated power controller or power control unit (p-unit) which can be dynamically or statically configured as a supervisor or supervisee. In some examples, dies are of the same size and functionality i.e., symmetric cores. However, dies can also be asymmetric. For example, some dies have different size and/or function than other dies.

Here, the term "interconnect" refers to a communication link, or channel, between two or more points or nodes. It may comprise one or more separate conduction paths such as wires, vias, waveguides, passive components, and/or active components. It may also comprise a fabric.

Here the term "interface" generally refers to software and/or hardware used to communicate with an interconnect. An interface may include logic and I/O driver/receiver to send and receive data over the interconnect or one or more wires.

Here the term "fabric" generally refers to communication mechanism having a known set of sources, destinations, routing rules, topology and other properties. The sources and destinations may be any type of data handling functional unit such as power management units. Fabrics can be two-dimensional spanning along an x-y plane of a die and/or three-dimensional (3D) spanning along an x-y-z plane of a stack of vertical and horizontally positioned dies. A single fabric may span multiple dies. A fabric can take any topology such as mesh topology, star topology, daisy chain topology. A fabric may be part of a network-on-chip (NoC) with multiple agents. These agents can be any functional unit.

Here the term "dielet" or "chiplet" generally refers to a physically distinct semiconductor die, typically connected to an adjacent die in a way that allows the fabric across a die boundary to function like a single fabric rather than as two distinct fabrics. Thus at least some dies may be dielets. Each dielet may include one or more p-units which can be dynamically or statically configured as a supervisor, supervisee or both.

Here the term "domain" generally refers to a logical or physical perimeter that has similar properties (e.g., supply voltage, operating frequency, type of circuits or logic, and/or workload type) and/or is controlled by a particular agent. For example, a domain may be a group of logic units or function units that are controlled by a particular supervisor. A domain may also be referred to an Autonomous Perimeter (AP). A domain can be an entire system-on-chip (SoC) or part of the SoC, and is governed by a p-unit.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional elements.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process. The examples can be combined in any combinations. For example, example 4 can be combined with example 2.

Example 1: A machine-readable storage media having machine-readable instructions stored thereon, that when executed, cause one or more machines to perform a method comprising: detecting connection of a USB-C device to a host system; determining bandwidth configuration of the USB-C device based on the detection; and instructing a policy manager about a power mode of operation of the USB-C device based on the bandwidth configuration.

Example 2: The machine-readable storage media of example 1, having machine-readable instructions stored thereon, that when executed, cause the one or more machines to perform the method comprising parsing a Billboard class exposed by the USB-C device.

Example 3: The machine-readable storage media of example 2, having machine-readable instructions stored thereon, that when executed, cause the one or more machines to perform the method comprising: extracting information on supported bandwidth configurations of the USB-C device from the parsed Billboard class.

Example 4: The machine-readable storage media of example 2, wherein parsing the Billboard class is via a core bus driver.

Example 5: The machine-readable storage media of example 1, wherein the policy manager is a device policy manager firmware associated with the USB-C device.

Example 6: The machine-readable storage media of claim 1, wherein instructing the policy manager about the power mode is via an API.

Example 7: The machine-readable storage media of example 1, wherein the power mode is one of full functionality mode or basic functionality mode.

Example 8: The machine-readable storage media of example 1, wherein the one or more machines are part of an embedded controller.

Example 9: The machine-readable storage media of example 1, wherein the one or more machines are part of system-on-chip.

Example 10: An apparatus comprising: one or more processor cores; and a power manager coupled to the one or more processor cores, wherein the power manager is to: detect connection of a USB-C device to a host system having the apparatus; determine bandwidth configuration of the USB-C device based on the detection; and instruct a policy manager about a power mode of operation of the USB-C device based on the bandwidth configuration.

Example 11: The apparatus of example 10, wherein the power manager is to parse a Billboard class exposed by the USB-C device.

Example 12: The apparatus of example 11, wherein the power manager is to extract information on supported bandwidth configurations of the USB-C device from the parsed Billboard class.

Example 13: The apparatus of example 11, wherein the power manager is to parse the Billboard class via a core bus driver.

Example 14: The apparatus of example 10, wherein the policy manager is a device policy manager firmware associated with the USB-C device.

Example 15: The apparatus of example 10, wherein the power mode is one of full functionality mode or basic functionality mode.

Example 16: The apparatus of example 10, wherein the one or more processor cores are part of an embedded controller.

Example 17: The apparatus of example 10, wherein the one or more processor cores are part of system-on-chip.

Example 18: The apparatus of example 10, wherein the power manager is part of an operating system, an embedded controller, and/or a power control unit.

Example 19: A system comprising: a memory; a processor coupled to the memory; a wireless interface to allow the processor to communicate with another device; and a USB-C port communicatively coupled to the processor, wherein the processor is to: detect connection of a USB-C device to the USB-C port; determine bandwidth configuration of the USB-C device based on the detection; and instruct a policy manager about a power mode of operation of the USB-C device based on the bandwidth configuration.

Example 20: The system of example 19, wherein the processor is to: parse a Billboard class exposed by the USB-C device; and extract information on supported bandwidth configurations of the USB-C device from the parsed Billboard class.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. A non-transitory machine-readable storage media having machine-readable instructions stored thereon, that when executed, cause one or more machines to perform a method performed by an operating system power manager (OSPM) comprising:
receiving information about a USB-C device connection to a USB port of a host system;
reading a USB Billboard class definition to determine bandwidth configurations of the USB-C device, the bandwidth configurations providing information about alternate modes, including full functionality mode and basic functionality mode;
processing the bandwidth configurations and selecting an optimal alternate mode for the USB-C based on a power profile of the host system, including selecting the basic functionality mode based on a power profile of the host system being in a power save mode and selecting the full functionality mode based on the power profile being in a performance mode; and
instructing a device policy manager (DPM) coupled to the USB port to enter into the optimal alternate mode and operate the port with a corresponding voltage or current setting.

2. The non-transitory machine-readable storage media of claim 1, wherein parsing the USB Billboard class definition is via a core bus driver.

3. The non-transitory machine-readable storage media of claim 1, wherein the DPM is a device policy manager firmware associated with the USB-C device.

4. The non-transitory machine-readable storage media of claim 1, wherein instructing the policy manager about the power mode is via an API.

5. The non-transitory machine-readable storage media of claim 1, wherein the one or more machines are part of an embedded controller.

6. The non-transitory machine-readable storage media of claim 1, wherein the one or more machines are part of a system-on-chip.

7. An apparatus comprising:
at least one USB port;
a device policy manager (DPM) coupled to the USB port;
a USB Billboard class definition;
one or more processor cores; and
an operating system power manager (OSPM) coupled to the one or more processor cores, wherein the power manager is to:
receive information about a USB-C device connection to the USB port of a host system comprising the apparatus;
read the USB Billboard class definition to determine bandwidth configurations of the USB-C device, the bandwidth configurations providing information about alternate modes, including full functionality mode and basic functionality mode;
process the bandwidth configurations and select an optimal alternate mode for the USB-C based on a power profile of the apparatus, including selecting the basic functionality mode based on a power profile of the apparatus being in a power save mode and selecting the full functionality mode based on the power profile being in a performance mode; and
instruct the DPM to enter into the optimal alternate mode and operate the USB port with a corresponding voltage or current setting.

8. The apparatus of claim 7, wherein the power manager is to parse the USB Billboard class definition via a core bus driver.

9. The apparatus of claim 7, wherein the DPM is a device policy manager firmware associated with the USB-C device.

10. The apparatus of claim 7, wherein the one or more processor cores are part of an embedded controller.

11. The apparatus of claim 7, wherein the one or more processor cores are part of a system-on-chip.

12. The apparatus of claim 7, wherein the OSPM is part of an operating system, an embedded controller, and/or a power control unit.

13. A system comprising:
a device policy manager (DPM);
a USB Billboard class definition;
a memory;
a processor coupled to the memory;
a wireless interface to allow the processor to communicate with another device; and
a USB-C port communicatively coupled to the processor and to the DPM, wherein the processor is to:
receive information about a USB-C device connection to the USB-C port of an apparatus;
read the USB Billboard class definition to determine bandwidth configuration of the USB-C device, the bandwidth configuration providing information about alternate modes including full functionality mode and basic functionality mode;
process the bandwidth configurations and select an optimal alternate mode for the USB-C based on a power profile of the system, including selecting the basic functionality mode based on a power profile of the apparatus being in a power save mode and selecting the full functionality mode based on the power profile being in a performance mode; and
instruct the DPM to enter into the optimal alternate mode and operate the USB port with a corresponding voltage or current setting.

* * * * *